No. 11,806. Reissued Jan. 30, 1900.
D. GERWE.
COFFIN.
(Application filed Sept. 29, 1899.)
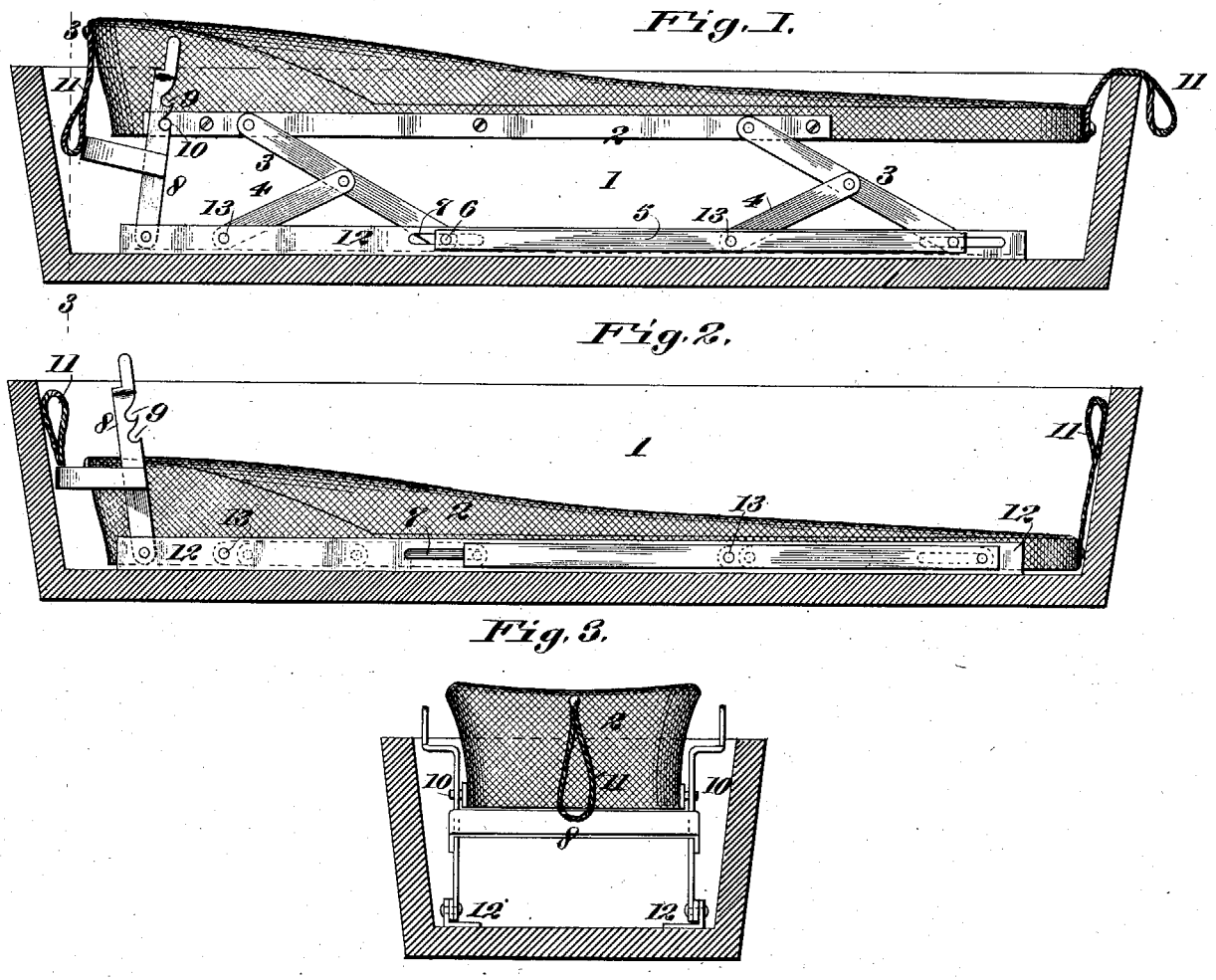
Witnesses:
Chas. E. Weil
Jno. W. Frank
Inventor:
David Gerwe,
By Carr & Carr.
Atty's

UNITED STATES PATENT OFFICE.

DAVID GERWE, OF ST. LOUIS, MISSOURI.

COFFIN.

SPECIFICATION forming part of Reissued Letters Patent No. 11,806, dated January 30, 1900.

Original No. 621,407, dated March 21, 1899. Application for reissue filed September 29, 1899. Serial No. 732,129.

*To all whom it may concern:*

Be it known that I, DAVID GERWE, a citizen of the United States, and a resident of the city of St. Louis, in the State of Missouri, have invented a new and useful Improvement in Coffins, of which the following is a specification.

My invention relates to coffins, and has for its principal object to provide means for better exposing the corpse to view and for giving the coffin the appearance of an ordinary couch.

It consists principally in a false bottom arranged to be vertically movable, as hereinafter described and claimed.

In the accompanying drawings, which form part of this specification, Figure 1 is a longitudinal vertical section of a coffin, showing my device with the false bottom raised. Fig. 2 is a like view with the bottom lowered. Fig. 3 is a cross-section on the line 3 3 of Fig. 1.

Like symbols refer to like parts in the several views.

The body of the coffin consists of a box or casket 1 of any suitable form. Inside thereof is a false bottom 2, which is preferably upholstered or cushioned after the style of a couch. The false bottom is provided with four or more links or bars 3 of equal length pivotally fastened thereto and adapted to turn in a vertical plane or planes lengthwise of the coffin. These links or bars 3 are respectively connected at their middle points to corresponding links or bars 4 of one-half their length and which are pivotally fastened to an angle-iron 12 or other suitable piece fixed to or resting on the true bottom, and thus, in effect, said links or bars are pivotally fastened to the true bottom of the coffin. The corresponding links of each pair are arranged parallel to each other and maintained in this position by connecting-rods 5, pivotally fastened thereto, whereby the movement of one link is transmitted to the link connected thereto by the rod. It is preferable to have the connecting-rods jointed at the lowermost ends of the longer links, as the longitudinal movement is greatest at this point, and therefore the looseness of the joints has the least effect and the leverage is greatest. Practically it is preferable to arrange the pairs of levers along the two sides of the false bottom, and it is sufficient to have one connecting-rod on each side.

Divers means may be used for insuring that the upward movement of the false bottom or couch shall be vertical, or approximately so. For this purpose horizontal slots or guides are provided in an angle-iron 12 or any other suitable piece on or near the true bottom of the coffin, and the ends of the longer links or studs 6 thereon slide in said horizontal slots 7. As shown in the drawings, these studs 6 may constitute the pins for fastening the connecting-rods to the links, and likewise studs 13, extending through the ends of the links 4 and the upright portion of the angle-iron, constitute a very convenient means for pivotally fastening said links 4 in proper relation. The angle-irons are fastened to the bottom by means of screws 14, passing through holes in the horizontal flanges, so that the angle-irons are practically a part of the bottom. This arrangement is, in effect, a lazy-tongs device, whereby the false bottom or couch can only move up and down in a straight vertical line. Suitable linings or drapery may be arranged so that when the false bottom is raised the corpse may appear to be resting on an ordinary couch.

The false bottom may be supported or fastened at any desired elevation by any convenient means—as, for instance, by a frame 8, pivoted on the bottom and bridging one end of the false bottom, said frame being provided with notches 9 in one edge of its upright parts adapted to receive lugs or studs 10, projecting laterally from the sides of the false bottom. So, likewise, any suitable means may be used for raising and lowering the false bottom; but I prefer, as the most simple and appropriate, one or more hand grips or loops 11 of cord or flexible fabric fastened to the false bottom.

It is obvious that the linkwork may be assembled as a separate and complete article. For this purpose the upper ends of the links are pivotally fastened to bars having screw-holes therein for securing them to the false bottom, and angle-irons are used to provide the elongated slots and the fastening for the links 4. This linkwork may be applied to a couch or false bottom, so that together they constitute a complete attachment ready for application to any coffin or casket of proper size.

What I claim is—

1. A coffin attachment comprising an upper bar and a lower bar, parallel links each pivotally fastened to one of said bars at one end and having its other end or a stud thereon to slide in a slot provided therefor in the other bar, parallel links pivotally fastened to said first-mentioned links and to the slotted bar, and a rod pivotally fastened to the parallel links of a set, substantially as described.

2. A coffin attachment comprising a couch, slotted pieces adapted to be secured to the coffin-bottom, four or more parallel links whose upper ends are pivotally connected to said couch and whose lower ends or studs thereon move horizontally in said slots, and links of one-half the length of said first-mentioned links pivotally connected respectively at one end to the middle point of said first-mentioned links and at the other end to the slotted pieces, substantially as described.

3. A coffin attachment comprising a couch, slotted angle-irons adapted to be secured to the bottom of the coffin, four or more parallel links whose upper ends are pivotally connected to said couch and whose lower ends or studs thereon move horizontally in said slots, and links of one-half the length of said first-mentioned links pivotally connected respectively at one end to the middle point of said first-mentioned links and at the other end to said angle-irons, substantially as described.

4. A coffin having a false bottom, four or more parallel links pivotally connected thereto and having their lower ends arranged to move horizontally, and links pivotally connected respectively to the middle point of the first-mentioned links and to the bottom of the coffin or a piece thereon at a distance from said middle point equal to one-half of the length of said first-mentioned links, substantially as and for the purpose set forth.

5. A coffin having a false bottom, four or more links pivotally connected thereto and having their lower ends engaged in horizontal slots, and parallel links pivotally connected at one end to the bottom of the coffin or a piece thereon, said last-mentioned links being one-half of the length of the first-mentioned links and being pivotally connected thereto respectively at their middle points, substantially as and for the purpose set forth.

6. A coffin having a false bottom, four or more links pivotally connected thereto and having their lower ends engaged in horizontal slots, and parallel links pivotally connected at one end to the bottom of the coffin or a piece thereon, said last-mentioned links being of one-half the length of the first-mentioned links and being pivotally connected to them respectively at their middle points, and rods connecting the pairs of links for maintaining them parallel, substantially as and for the purpose set forth.

DAVID GERWE.

In presence of—
CHAS. E. WISE,
WILLIAM P. CARR.